(12) United States Patent
Iwamoto et al.

(10) Patent No.: US 10,518,482 B2
(45) Date of Patent: Dec. 31, 2019

(54) METAL-RESIN JOINING DEVICE

(71) Applicant: DENGENSHA TOA CO., LTD., Kanagawa (JP)

(72) Inventors: Yoshiaki Iwamoto, Kanagawa (JP); Shuhei Saeki, Kanagawa (JP)

(73) Assignee: Dengensha Toa Co., Ltd., Kanagawa (JP)

( * ) Notice: Subject to any disclaimer, the term of this patent is extended or adjusted under 35 U.S.C. 154(b) by 52 days.

(21) Appl. No.: 16/066,526

(22) PCT Filed: Jan. 5, 2018

(86) PCT No.: PCT/JP2018/000104
§ 371 (c)(1),
(2) Date: Jun. 27, 2018

(87) PCT Pub. No.: WO2018/220892
PCT Pub. Date: Dec. 6, 2018

(65) Prior Publication Data
US 2019/0358910 A1 Nov. 28, 2019

(30) Foreign Application Priority Data
Jun. 1, 2017 (JP) ................................. 2017-108967

(51) Int. Cl.
 *B29C 65/44* (2006.01)
 *B29C 65/00* (2006.01)
 *B29C 65/30* (2006.01)
(52) U.S. Cl.
 CPC .............. *B29C 65/44* (2013.01); *B29C 65/30* (2013.01); *B29C 66/1122* (2013.01);
 (Continued)

(58) Field of Classification Search
 CPC ...... B29C 65/44; B29C 65/30; B29C 66/1122; B29C 66/21; B29C 66/3472;
 (Continued)

(56) References Cited

U.S. PATENT DOCUMENTS 6,459,064 B1* 10/2002 Trubert .................. B23K 11/00
 219/85.1
8,334,474 B1* 12/2012 Oatridge .............. B23K 11/315
 219/86.22
2013/0056451 A1 3/2013 Hasegawa et al.

FOREIGN PATENT DOCUMENTS

CN 102974931 A 3/2013
DE 10 2013 015459 A 8/2014
(Continued)

OTHER PUBLICATIONS

Machine Translation of JP-2011031267-A (Year: 2011).*
(Continued)

*Primary Examiner* — Daniel McNally
(74) *Attorney, Agent, or Firm* — The Marbury Law Group, PLLC

(57) ABSTRACT

A metal-resin joining device joins a thermoplastic resin plate (12) to a metal plate (13) by melting the resin plate (12) in contact with the metal plate (13) through heating an exposed face of the metal plate (13) by one-sided resistive heating. The metal-resin joining device has a center electrode (24a) that is brought in contact with the metal plate (13) and a peripheral electrode (24b) that is brought in contact with the metal plate (13) to annularly surround the center electrode (24a) and to which a current flows from the center electrode (24a) via the metal plate (13), wherein the peripheral electrode (24b) is made of a metal material having a higher electrical resistance than the center electrode (24a).

13 Claims, 17 Drawing Sheets

(52) U.S. Cl.
CPC .......... *B29C 66/21* (2013.01); *B29C 66/3472* (2013.01); *B29C 66/3494* (2013.01); *B29C 66/71* (2013.01); *B29C 66/7392* (2013.01); *B29C 66/73116* (2013.01); *B29C 66/7422* (2013.01); *B29C 66/8122* (2013.01); *B29C 66/81261* (2013.01); *B29C 66/81262* (2013.01); *B29C 66/845* (2013.01)

(58) Field of Classification Search
CPC ................ B29C 66/3494; B29C 66/71; B29C 66/73116; B29C 66/7392; B29C 66/7422; B29C 66/8122; B29C 66/81261; B29C 66/81262; B29C 66/845
USPC ...................... 156/272.2, 379.6, 273.9, 274.4
See application file for complete search history.

(56) References Cited

FOREIGN PATENT DOCUMENTS

| DE | 102013015459 A1 | * | 8/2014 | ............. B29C 65/44 |
|---|---|---|---|---|
| JP | 53-124142 A | | 10/1978 | |
| JP | 05-185242 A | | 7/1993 | |
| JP | 07-080944 A | | 3/1995 | |
| JP | 2011-031267 A | | 2/2011 | |
| JP | 2011031267 A | * | 2/2011 | |
| JP | 2013-066932 A | | 4/2013 | |
| JP | 2013-193441 A | | 9/2013 | |
| JP | 6255523 B | | 12/2017 | |

OTHER PUBLICATIONS

Machine Translation DE-102013015459-A1 (Year: 2014).*
International search report and written opinion received in connection with international application No. PCT/JP2018/000104, dated Feb. 5, 2018 (with English Translations).
Notification of Reasons for Refusal mailed in connection with Japanese Patent Application No. 2017-108967; dated Oct. 20, 2017.
Decision to Grant mailed in connection with Japanese Patent Application No. 2017-108967; dated Nov. 17, 2017.
Extended European Search Report for corresponding application EP 18729855.9, dated Jun. 14, 2019.

* cited by examiner temperature distribution at joined interface

METAL-RESIN JOINING DEVICE

RELATED APPLICATIONS

This application is a U.S. national phase entry of international application no. PCT/JP2018/000104, filed on Jan. 5, 2018, which claims priority to Japanese Application No. 2017-108967, filed Jun. 1, 2017, the disclosures of which are incorporated herein by reference in their entireties.

TECHNICAL FIELD

The present invention relates to a metal-resin joining device that melts and joins a thermoplastic resin by one-sided resistive heating to a metal member.

BACKGROUND ART

Conventionally, there is a device such as a joining device 10 in FIG. 12A that joins a thermoplastic resin to a metal member. The joining device 10 melts a part of a thermoplastic resin plate 12 placed on a fixed base 11 and welds the melted part to a metal plate 13 placed on the resin plate 12, to join the resin plate 12 to the metal plate 13.

The joining device 10 has a positive electrode 14 and a negative electrode 15 in a rod shape which are both pressed against an upper face of the metal plate 13, and a DC power supply 16 having a positive terminal connected to the positive electrode 14 and a negative terminal connected to the negative electrode 15. When the resin plate 12 is joined to the metal plate 13 by the joining device 10, the front end of each electrode 14, 15 to which the power supply 16 is connected is brought in contact with the metal plate 13 with a given pressing force. This contact allows a current 17 to flow through the metal plate 13 from the positive electrode 14 to the negative electrode 15. The metal plate 13 is heated with the current 17, to cause a part of the resin plate 12 that is in contact with a metal portion to have a resin meltable temperature so as to be melted as indicated by a reference numeral 12a. The melted portion is referred to as a melted resin portion 12a.

As shown in FIG. 12B, the melted resin portion 12a has circular portions 12a1 that spread in a substantially circular shape around electrode dents 14a, 15b corresponding to front end positions of the electrodes 14, 15, and a connecting portion 12a2 that connects one circular portion 12a1 with another in a given width. The melted resin portion 12a having this shape is welded to the metal plate 13, and then, the metal plate 13 is cooled so that the melted resin portion 12a is solidified and joined to the metal plate 13. Thus, the resin plate 12 is joined to the metal plate 13. Patent Document 1, for example, discloses a method as this kind of technique.

PRIOR ART DOCUMENT

Patent Document

Patent document 1: Japanese Patent Application Publication No. 2013-193441

SUMMARY OF THE INVENTION

Problem to be Solved by the Invention

As described above, when the resin plate 12 is joined to the metal plate 13, the current 17 mainly flows in a linear portion between the front ends of the electrodes 14, 15 where the current density is highest. Therefore, a portion resistively heated by the current in the metal plate 13 is mainly the linear portion between the electrodes 14, 15, and other heated portions are heated planarly by the heat from the resistively heated portion to its surrounding by heat conduction. Accordingly, in order to make the metal plate 13 planarly have a given size of a heated area, the metal plate 13 needs to be heated for a long time by heat conduction.

In this case, obtaining a planarly desired size of a heated area is difficult.

The present invention has been made in view of such problems, and provides a metal-resin joining device that can set a resistively heated portion of a metal plate by a current for melting a resin plate in an appropriate planar shape.

Means for Solving the Problem

To solve the problem above, the invention according to a first aspect provides a metal-resin joining device for joining a thermoplastic resin material to a metal material by melting the resin material in contact with the metal material through heating an exposed face of the metal material by one-sided resistive heating, the device having: a center electrode that is brought in contact with the metal material; and a peripheral electrode that is brought in contact with the metal material so as to annularly surround the center electrode and to which a current flows from the center electrode via the metal material, wherein the peripheral electrode is made of a metal material having a higher electrical resistance than the center electrode.

The invention according to a second aspect provides a metal-resin joining device for joining a thermoplastic resin material to a metal material by melting the resin material in contact with the metal material through heating the metal material, the device having: a center electrode that is brought in contact with the metal material; and a peripheral electrode that is brought in contact with the metal material so as to annularly surround the center electrode and to which a current flows from the center electrode via the metal material, wherein the peripheral electrode is made of a metal material having a lower thermal conductivity than the center electrode.

The invention according to a third aspect provides a metal-resin joining device for joining a thermoplastic resin material to a metal material by melting the resin material in contact with the metal material through heating the metal material, the device having: a center electrode that is brought in contact with the metal material; and a peripheral electrode that is brought in contact with the metal material so as to annularly surround the center electrode and to which a current flows from the center electrode via the metal material, wherein the peripheral electrode is made of a metal material having a higher electrical resistance and a lower thermal conductivity than the center electrode.

Effect of the Invention

The present invention provides a metal-resin joining device that can set a portion resistively heated by a current of a metal plate for melting a resin plate in an appropriate planar shape.

EMBODIMENTS FOR CARRYING OUT THE INVENTION

Embodiments of the present invention will be described with reference to the accompanying drawings.

Configuration of Embodiment

Figure 1:
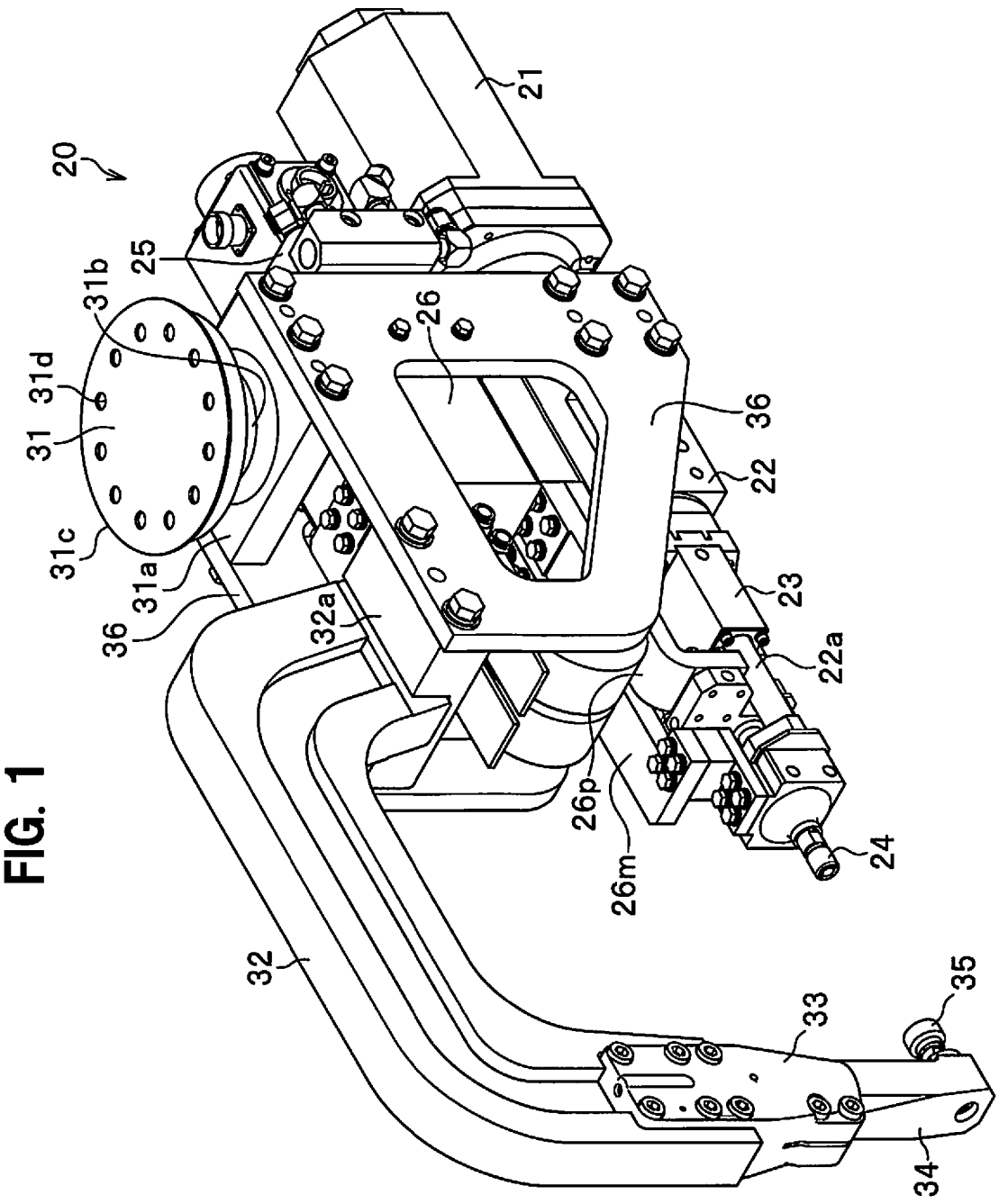
FIG. 1 is a perspective view of a metal-resin joining device according to an embodiment of the present invention.
Figure 2:
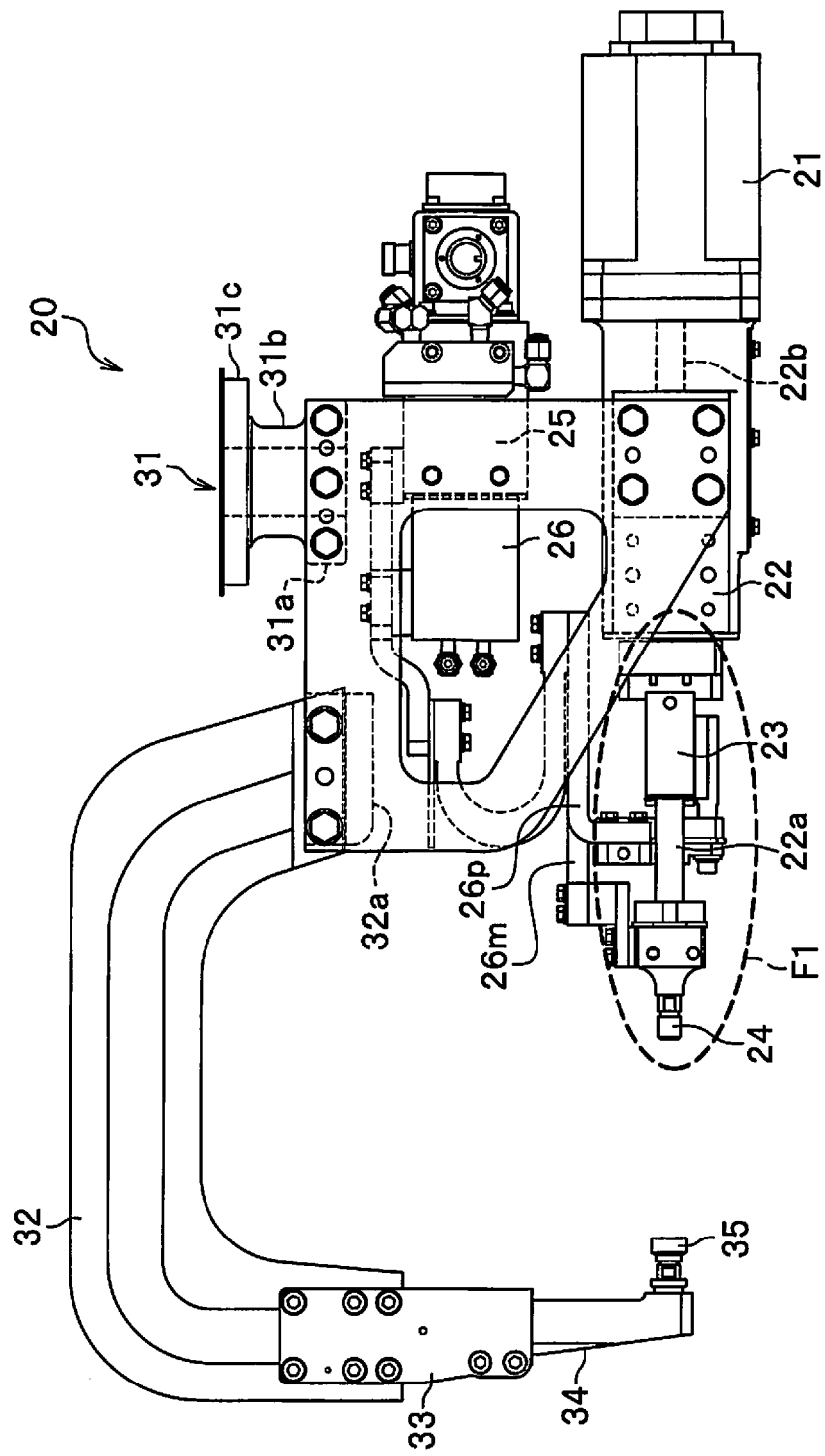
FIG. 2 is a side view of the metal-resin joining device according to the present embodiment.
Figure 3:
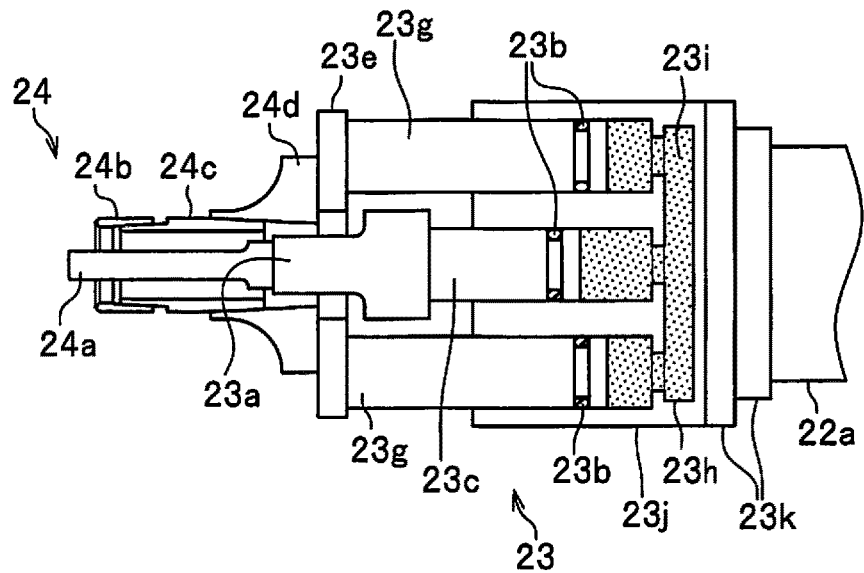
FIG. 3 is a partial cross-sectional view of an electrode unit and an electrode pressing unit in a circle in FIG. 2.

FIG. 1 is a perspective view of a metal-resin joining device according to an embodiment of the present invention, FIG. 2 is a side view of the metal-resin joining device, and FIG. 3 is a partial cross-sectional view of an electrode unit and an electrode pressing unit in a circle in FIG. 2.

A metal-resin joining device (joining device) 20 in FIG. 1 melts a part of a thermoplastic resin member (see a resin plate 12 in FIG. 5) placed in contact with a metal member (see a metal plate 13 in FIG. 5) by heat of the metal member heated by flowing a current therethrough, and welds the melted resin portion (see a melted resin portion 12b in FIG. 5) to the metal member, to join the resin member to the metal member. Note that a melting temperature of the resin member is lower than that of the metal member. Aluminum or the like is used as the metal member.

The joining device 20 has a drive servomotor (motor) 21, a drive unit 22, an electrode pressing unit 23, an electrode unit 24, a transformer 25, a rectifier 26, a mounting unit 31, an arm 32, an arm holder 33, a round arm 34, a pressure receiving unit 35, and fixing plates 36, 36 on both sides.

The motor 21 is in a substantially columnar shape and is assembled to the drive unit 22 with its rotating shaft (shaft) set, for example, horizontal. The drive unit 22 is in a substantially rectangular parallelepiped shape (see FIG. 2) extending along the axial direction of the motor 21. Note that, in the present embodiment, a description will be given on the assumption that the shaft of the motor 21 of the joining device 20 and the drive unit 22 extending in the axial direction are horizontally arranged as shown in FIGS. 1 and 2. In FIGS. 1 and 2, though the motor 21 is directly connected to the drive unit 22, the motor 21 may be connected to the drive unit 22 via a transmission mechanism such as a pulley connected by a belt therebetween. Further, the joining device 20 may be arranged not only to in the horizontal direction shown in FIG. 2 but also in the vertical direction or an oblique direction with respect to the horizontal direction.

The drive unit 22 has a rod 22a that extends forward from inside toward the pressure receiving unit 35 (see FIG. 8) and retracts (see FIG. 9), and the electrode pressing unit 23 is assembled at the front end of the rod 22a. The electrode unit 24 is assembled at the front of the electrode pressing unit 23. The transformer 25 above the drive unit 22 steps down an AC voltage supplied from the power supply (not shown) to the primary side. A rectifier 26 that rectifies an AC current to a DC current is electrically connected to the secondary side of the transformer 25. The output side of the rectifier 26 is electrically connected to the electrode unit 24 via secondary conductors 26p, 26m. Note that the power supply has the transformer 25 and the rectifier 26, but may be replaced by a power supply for joining or the like.

The drive unit 22, the transformer 25 and the rectifier 26 arranged above the drive unit 22 are sandwiched by inverse trapezoidal fixing plates 36, 36 having openings from both ends, and are fixed thereto with screws. Through holes (or tapped holes) are formed in the fixing plates 36, 36 and tapped holes are formed in the drive unit 22, the transformer 25 and the rectifier 26 so as to align with the through holes. The fixing plates 36, 36 are arranged at both sides of the drive unit 22, the transformer 25 and the rectifier 26, with the respective through holes aligned with the respective tapped holes. The screws are inserted through the through holes from the front face of the respective fixing plates 36, 36 to be screwed in the tapped holes. Thus, the transformer 25 and the rectifier 26 arranged on the drive unit 22 are sandwiched by the fixing plates 36, 36 from both sides so as to be integrated.

The mounting unit 31 (see FIG. 2) is screwed above the transformer 25 between the fixing plates 36, 36. The mounting unit 31 has a plate portion 31a to be fitted between the fixing plates 36, 36, a column portion 31b (FIG. 2) slightly protruding from the center of the upper face of the plate portion 31a, and a disk portion 31c on the column portion 31b. Through holes (or tapped holes) 31d are formed circumferentially at given intervals in the upper face of the disk portion 31c.

When the mounting unit 31 is mounted to a fixed portion such as a robot or a support column (not shown) via the through holes 31d, bolts of the fixed portion are inserted from the front side into the through holes 31d and are fastened with nuts from the back side. Note that if the through holes 31d are the tapped holes, the screws of the fixed portion are screwed. Further, the mounting unit 31 may be mounted not only above the transformer 25 but also on the side or the rear of the joining device 20 freely, depending on the purpose. Still further, if the joining device 20 is mounted to the robot, a coupling 23k (see FIG. 3) may be attached to an extendable rod or the like of the robot, using the portion between the coupling 23k and electrodes 24a, 24b. In this case, the robot supplies a current to each electrode 24a, 24b.

The arm 32 is screwed to the front of the mounting unit 31 between the fixing plates 36, 36. The arm 32 is in a substantially arch shape, has a base 32a in a planar shape at the base end, and has an arm holder 33 screwed to the front end. The base 32a is screwed between the fixing plates 36, 36 so that the arm 32 is integrally assembled with the drive unit 22, the transformer 25 and the rectifier 26, and the like.

The columnar round arm 34 is fixed at the front end of the arm holder 33. The pressure receiving portion 35 (see FIG. 2) is fixed to the front end of the round arm 34 that faces the electrode unit 24, apart from the front end of the electrode unit 24 at a given distance.

As shown in FIG. 2, the rotating shaft of the motor 21 is assembled in a ball screw 22b in the drive unit 22. A threaded shaft (not shown) of the ball screw 22b is attached linearly to the rotating shaft of the motor 21, and the base end of the rod 22a is attached to a ball nut (not shown) assembled to the threaded shaft. The ball nut moves forward (toward the pressure receiving unit 35) during the normal rotation of the motor 21, to extend the rod 22a forward accordingly (see FIG. 8B). The ball nut moves rearward during the reverse rotation of the motor 21, to contract the rod 22a rearward accordingly (see FIG. 9B). Based on the extension and contraction of the rod 22a, the electrode pressing unit 23 moves back and forth, and the electrode unit 24 also moves back and forth accordingly as described later.

A detailed configuration of the electrode pressing unit 23 and the electrode unit 24 in a circle µl in FIG. 2 will be described with reference to FIG. 3.

The electrode pressing unit 23 has an electrode holder 23a in a rod shape having the center electrode 24a fixed at its front end, and a cylindrical piston 23c onto which the electrode holder 23a is inserted so as to be movable back and forth. A packing 23b formed of an O-ring that is fitted in a peripheral groove is arranged at the base end of the piston 23c. Further, the electrode pressing unit 23 has a piston top 23e fixed to the rear of an electrode holder 24d and cylindrical pistons 23g, 23g onto which the piston top 23e inserted so as to be movable back and forth. The packings 23b, 23b formed of O-rings fitted in the peripheral grooves are arranged at the base ends of the pistons 23g, 23g.

Each piston 23c, 23g, 23g is movably inserted into a cylinder of each of three cylindrical hollows formed in a cylinder portion 23j in a rectangular parallelepiped shape (see reference numeral 23 in FIG. 1). At the time of the insertion, when the pistons 23c, 23g, 23g are inserted to deepest positions, the front ends thereof protrude from the cylinder portion 23j. A connecting portion 23h that communicates with the cylinders via a hollow is formed at the rear ends of the cylinders. A fluid 23i such as oil, grease, water or the like is filled hermetically in the connecting portion 23h. The fluid 23i is filled up to the rear end face of each piston 23c, 23g, 23g.

The cylinder portion 23j is connected to the front end of the rod 22a by the coupling 23k.

Next, the electrode unit 24 has the center electrode 24a in a rod shape having a front end face in a curved shape, an annular peripheral electrode 24b having a pointed front end and surrounding the center electrode 24a, and an annular shank 24c that is fixed in the electrode holder 24d at the rear of the peripheral electrode 24b. The center electrode 24a and the peripheral electrode 24b are technical features of the present embodiment. Note that the peripheral electrode 24b is preferably concentric with the center electrode 24a.

Figure 4:
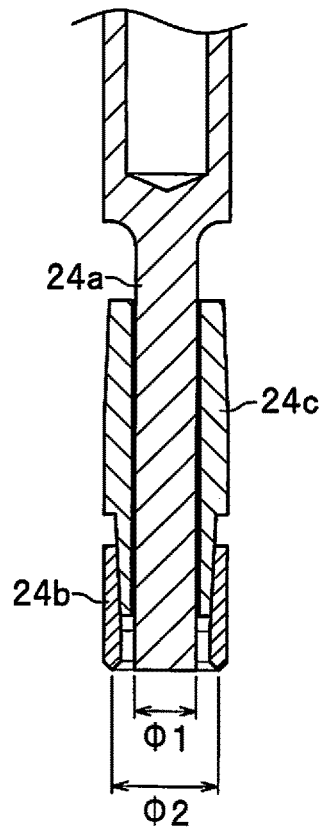
FIG. 4 shows a configuration example of a center electrode and a peripheral electrode of the metal-resin joining device according to the present embodiment.

FIG. 4 shows a configuration example of the center electrode 24a and the peripheral electrode 24b. The center electrode 24a and the peripheral electrode 24b in FIG. 4 are used, for example, to melt a resin member at flange portions having a small width of vehicle parts. The curved surface at the front end of the center electrode 24a has a radius of curvature of R 75, for example, and the diameter $\phi 1$ at the front end is 8 mm. Further, the diameter $\phi 2$ at the pointed front end in an annular shape of the peripheral electrode 24b is 14 mm. Furthermore, only the peripheral electrode 24b is replacable, to reduce the number of consumable parts.

The peripheral electrode 24b may be in an annular shape such as an ellipse or a substantially circle, besides a concentric circle, and further, may be in an annular shape of a polygon such as a triangle or a rectangle. The shank 24c is preferably in a shape corresponding to the shape of the peripheral electrode 24b. In addition, the center electrode 24a, the peripheral electrode 24b and the shank 24c are cooled by cooling water (not shown).

Figure 5:
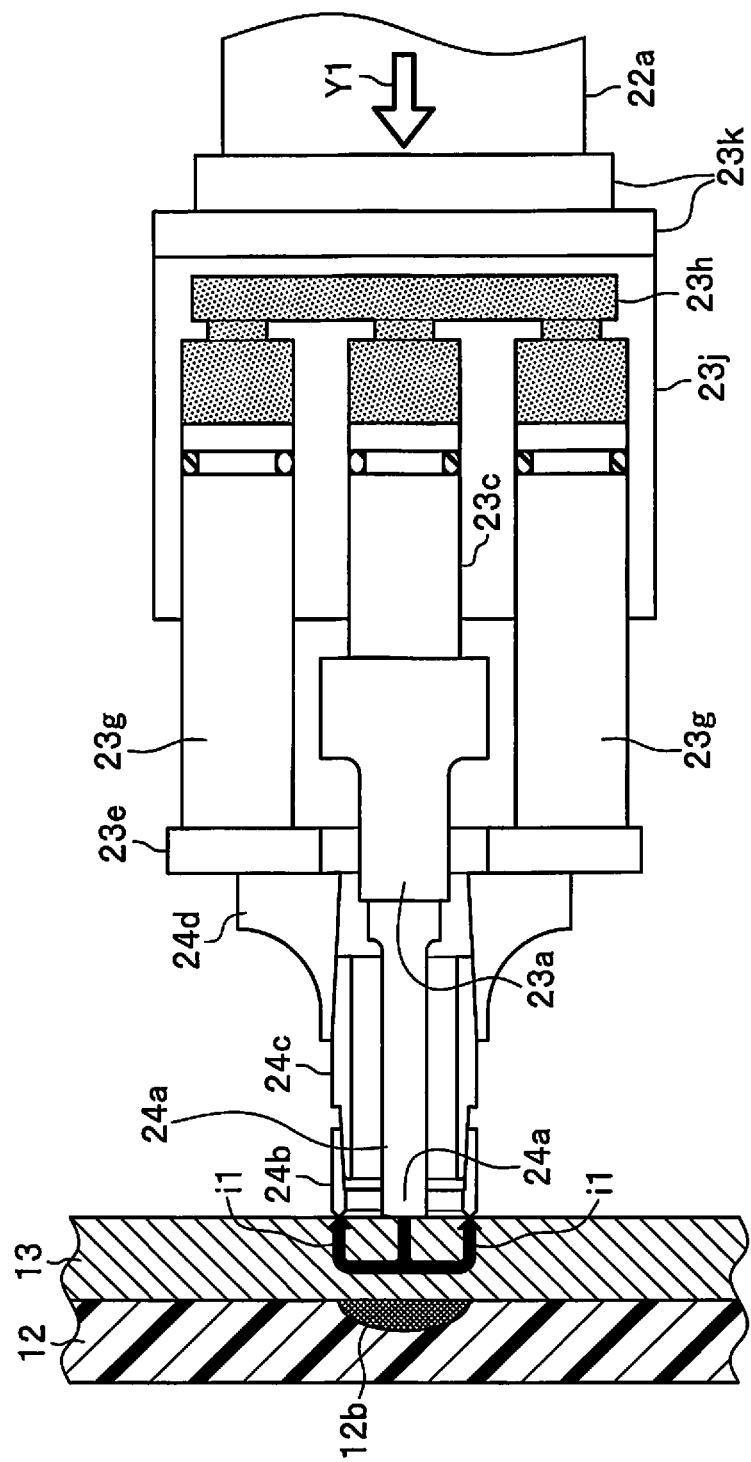
FIG. 5 is a side view of the center electrode and peripheral electrode of the metal-resin joining device according to the present embodiment being in contact with a metal plate.

FIG. 5 shows that the center electrode 24a and the peripheral electrode 24b are in contact with the metal plate 13. The rod 22a is extended as indicated by an arrow Y1, to press the center electrode 24a and the peripheral electrode 24b against the metal plate 13 that is placed to face the resin plate 12, with a given pressure, by extension/contraction of the respective pistons 23c, 23g, 23g. The center electrode 24a and the peripheral electrode 24b in this state are shown in FIG. 6A.

Figure 6A:
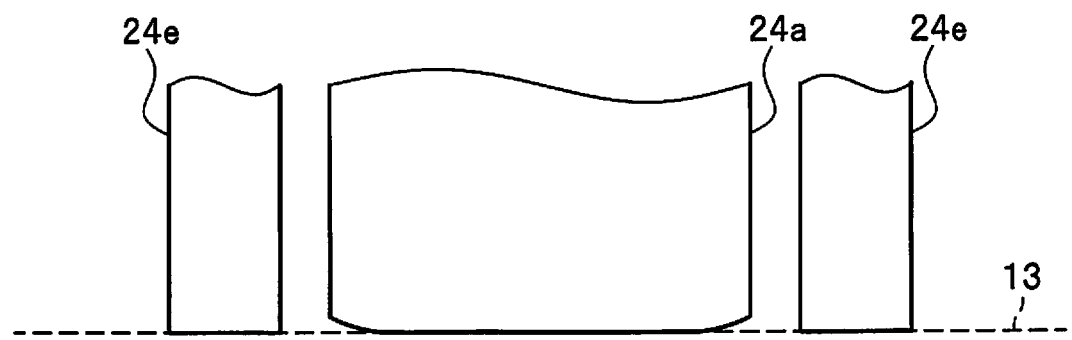
FIG. 6A shows the center electrode and peripheral electrode of the metal-resin joining device according to the present embodiment being in contact with the metal plate.

A peripheral electrode 24e shown in FIG. 6A is formed of a metal material that has a higher electrical resistance and a lower thermal conductivity than the center electrode 24a. The condition that the peripheral electrode 24e has a higher electrical resistance than the center electrode 24a is referred to as a first condition. The condition that the peripheral electrode 24e has a lower thermal conductivity than the center electrode 24a is referred to as a second condition.

In order to conform with the first and second conditions, the center electrode 24a is assumed to be made of chromium copper (CrCu) of copper alloy and the peripheral electrode 24e is assumed to be made of stainless steel (SUS 304), for example. Besides, as long as the peripheral electrode 24e is made of a metal material having a higher electrical resistance and a lower thermal conductivity than the center electrode 24a, the peripheral electrode 24e may be made of tungsten, molybdenum or the like, and the center electrode 24a may be made of brass or the like. However, the metal plate 13 with which both the electrodes 24a and 24e contact is made of aluminum, for example. Further, the peripheral electrode 24e may be made of stainless steel to prevent rust.

When a current i1 flows from the center electrode 24a to the peripheral electrode 24e as shown in FIG. 5, the metal plate 13 is resistively heated with the current i1. The resistively heated region is formed by the current i1 flowing evenly from the center electrode 24a to the annular peripheral electrode 24e, so that the resistively heated region is in a shape corresponding to the annular area of the peripheral electrode 24e. In this manner, the portion of the resin plate 12 contacting the metal plate 13 that has reached a resin meltable temperature by resistively heating melts as indicated by a reference numeral 12b. The melted portion is referred to as a melted resin portion 12b.

Figure 6B:
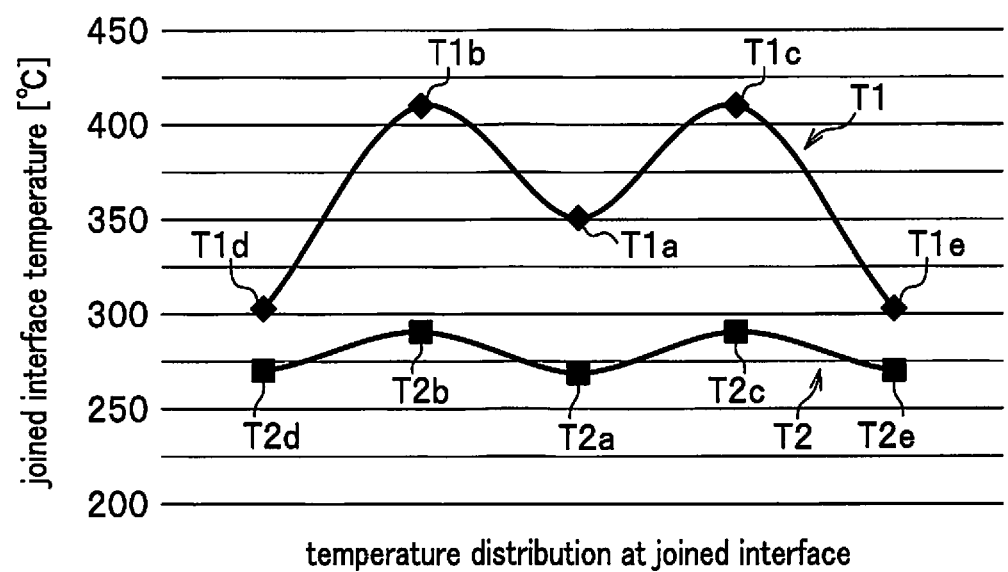
FIG. 6B is a graph showing temperature distribution curves T1, T2 at a joined interface between the center electrode and peripheral electrode of the metal-resin joining device of the present embodiment and the metal plate.

Here, a first configuration example will be described in which both the center electrode 24a and the peripheral electrode 24e are made of the same material of chromium copper. In the first configuration example, a temperature distribution of a joined interface between each electrode 24a, 24e and the metal plate 13 is shown in FIG. 6B by a curve T1, when the current i1 flows from the center electrode 24a to the peripheral electrode 24e.

In the first configuration example, since both the center electrode 24a and the peripheral electrode 24e are made of the same material of chromium copper, a current density is higher at a portion closer to the center electrode 24a when the current i1 flows in the metal plate 13 from the center electrode 24a to the peripheral electrode 24e.

Therefore, as indicated at points T1b, T1c (about 410° C.) on the curve T1, the current density on the center electrode 24a side in the metal plate 13 tends to be higher to raise the temperature easily. However, the center region (front end center region) of the front end in a curved shape of the center electrode 24a has a larger contact area with the metal plate 13 than the peripheral region. Therefore, the heat of the metal plate 13 contacting the front end center region of the center electrode 24a easily escapes to the base end of the center electrode 24a. Thus, since a large amount of heat escapes, the temperature of a portion of the metal plate 13 that contacts the front end center region decreases, as indicated at a point T1a (about 350° C.) on the curve T1. This phenomenon of heat escape is also the same in the peripheral electrode 24e, and since the heat is transferred to escape from the front end to the base end of the peripheral electrode 24e, the temperature is lowered as indicated at points T1d, T1e (about 300° C.) on the curve T1.

Thus, as indicated by the curve T1, the temperature of the metal plate 13 surrounded by the peripheral electrode 24e is low (T1a) at the front end center region of the center electrode 24a, rises toward the peripheral electrode 24e, and is the highest (T1b, T1c) around peripheral edge of the center electrode 24a. The temperature decreases from the positions at the highest temperature towards the peripheral electrode 24e and is the lowest (T1d, T1e) at the front end of the peripheral electrode 24e. Accordingly, the temperature distribution of the metal plate 13 surrounded by the peripheral electrode 24e is in a wave shape having amplitude.

When the resin plate 12 is melted by the metal plate 13 having the temperature distribution in a wave shape having amplitude in the first configuration example 1, as shown in FIG. 5, unevenness occurs in the degree of the melting of the melted resin portion 12b, to make the joining strength between the metal plate 13 and the resin plate 12 decrease.

Then, as described above to satisfy the first and second conditions, if the peripheral electrode 24e is made of stainless steel and the center electrode 24a is made of chromium copper, a larger amount of Joule heat is generated in the peripheral electrode 24e than in the center electrode 24a, since the peripheral electrode 24e has a higher electrical resistance than the center electrode 24a. Further, since the peripheral electrode 24e has a lower thermal conductivity than the center electrode 24a, the heat generated in the metal plate 13 is more difficult to escape from the peripheral electrode 24e than the center electrode 24a.

In the configuration satisfying the first and second conditions, the temperature distribution at the joined interface between each electrode 24a, 24e and the metal plate 13 when the current i1 flows from the center electrode 24a to the peripheral electrode 24e is shown by a curve T2 in FIG. 6B.

When the current i1 flows from the center electrode 24a to the peripheral electrode 24e, the current density decreases from the center electrode 24a toward the peripheral electrode 24e. However, in the configuration satisfying the first and second conditions, since the peripheral electrode 24e has a higher electrical resistance and a lower thermal conductivity than the center electrode 24a according to the material difference between the above-mentioned members, the heat generated from the metal plate 13 has, as shown by the curve T2, a substantially flat (substantially even) temperature distribution in the peripheral electrode 24e.

This phenomenon will be described in detail. Since the center electrode 24a is made of chromium copper, its thermal conductivity is higher than that of the peripheral electrode 24e made of stainless steel. For this reason, the front end center region of the center electrode 24a has a high current density to have a high temperature, as well as a high heat conductivity to absorb the heat easily. As shown at a point T2a (about 270° C.), the temperature at the point T2a is lower than that at the point T1a. On the other hand, since the peripheral electrode 24e has a higher electrical resistance than the center electrode 24a, Joule heat is more generated in the peripheral electrode 24e than in the center electrode 24a, to increase the temperature. Further, since the peripheral electrode 24e is made of stainless steel, its thermal conductivity is low. For this reason, the front end of the peripheral electrode 24e has a lower current density to have a lower temperature than the center electrode 24a. However, as described above, since Joule heat is generated more in the peripheral electrode 24e than in the center electrode 24a and the thermal conductivity is low to hardly absorb the heat, the front end of the peripheral electrode 24e has approximately the same temperature as the center electrode 24a (about 270° C. at the point T2a), as indicated at points T2d and T2e (about 270° C.).

Further, since the front end face of the center electrode 24a is in a round shape, the region of the metal plate 13 between the front end center region (point T2a) of the center electrode 24a and the front end (points T2d, T2e) of the peripheral electrode 24e is in less contact with the electrodes 24a, 24e from the front end center region toward the peripheral edge, so that the heat is less absorbed and the temperature increases. With the temperature increase, the peripheral edge of the center electrode 24a that contacts the metal plate 13 has the highest temperature (points T2b, T2c (about 290° C.). The temperature decreases from the positions at the highest temperature toward the peripheral electrode 24e and is the lowest (about 270° C. at the points T2d and T2e) at the front end of the peripheral electrode 24e.

At this time, the highest temperature (about 290° C. at the points T2b and T2c) is substantially the same as that at the front end center region of the center electrode 24a (about 270° C. at the point T2a) and the front end of the peripheral electrode 24e (about 270° C. at the points T2d and T2e). In other words, the temperature distribution has small amplitude and is substantially even.

In this manner, the metal plate 13 is heated to have a substantially even temperature distribution between about 270° C. and about 290° C. Aluminum used as the material of the metal plate 13 does not melt because its melting point is 660° C. Further, the material of the resin plate 12 is, for example, PA 6 of nylon and has a melting point between 225° C. and 350° C. Therefore, if the temperature distribution of the annular front end of the peripheral electrode 24e falls within the range between 250 and 300° C., the temperature distribution to the front end center region of the center electrode 24a also falls within the range between 250 and 300° C., so as not to exceed a melting temperature of the melted resin portion 12b.

Next, a third condition will be described. As shown in FIG. 5, the third condition is that the front end in an annular shape of the peripheral electrode 24b is in a pointed shape in cross-section. Since the peripheral electrode 24b having a configuration satisfying the third condition has the pointed front end in an annular shape, the peripheral electrode 24b contacts the metal plate 13 annularly. Further, the peripheral electrode 24b has the pointed front end to have a small contact area with the metal plate 13, to cause a current density to be increased around the front end to have a heating temperature increased.

The angle of the pointed front end is assumed to be, for example, 90 degrees. The front end having the angle of 90 degrees is set to keep its shape so as not to be deformed or broken when pressed against the metal plate 13. The front end preferably has a shape to firstly contact the metal plate 13 annularly, and then, to be gradually dented into the metal plate 13 when pressed, to have a larger contact area and a less decreased surface pressure. Note that the front end may have any angle as long as the front end is pointed to contact the planar metal plate 13 annularly.

Figure 7A:
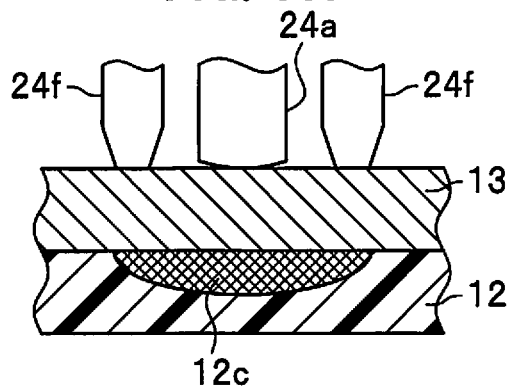
FIG. 7A shows the center electrode and the peripheral electrode having a flat front end (front end face) in an annular shape of a configuration example 2 being in contact with the metal plate.
Figure 7B:
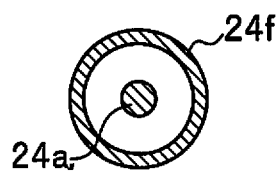
FIG. 7B shows the center electrode and the front end face of the peripheral electrode being in contact with the metal plate without any gap.
Figure 7C:
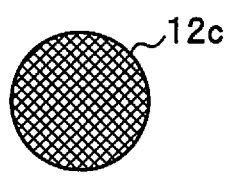
FIG. 7C shows a circular shape of a melted resin portion of the resin plate.

Here, as shown in FIG. 7A, a peripheral electrode 24f having a flat front end (referred to as a front end face) in an annular shape will be described as a second configuration example. In the case of the peripheral electrode 24f, when the front end face contacts the planar metal plate 13, the front end face is assumed to contact the metal plate 13 without any gap, as shown in FIG. 7B. In the contact state, when a current flows from the center electrode 24a to the peripheral electrode 24f, the heated region of the metal plate 13 is in a circular shape including the front end face and an inner part thereof. Therefore, as shown in FIG. 7C, the melted resin portion 12b of the resin plate 12 is in a circular shape.

Figure 7D:
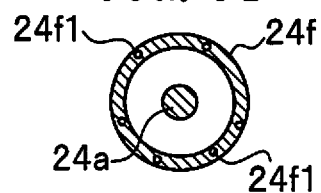
FIG. 7D shows electrolytic corrosions generated on the front end face of the peripheral electrode.
Figure 7E:
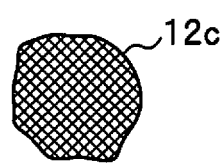
FIG. 7E shows a distorted circular shape of the melted resin portion of the resin plate.

Then, if the resin plate 12 is melted several times while the peripheral electrode 24f is repeatedly brought into and out of contact with the metal plate 13, electric corrosion 24f1 is generated at several portions on the front end of the peripheral electrode 24f, as shown in FIG. 7D. Since the metal plate 13 is made of aluminum and an oxide film is formed on the face of the metal plate 13, if the peripheral electrode 24f is melted several times, the oxide film adheres to the peripheral electrode 24f, to cause the electric corrosion 24f1 to be generated. If the electric corrosion 24f1 is generated at several portions, the temperature at the electric corrosion 24f1 is higher than that at the other portions. Therefore, the melted area of the resin plate 12 corresponding to the peripheral electrode 24f is not formed in a circular shape but formed in a distorted circular shape, as shown in FIG. 7E. In this case, since the joining shape and area of the resin plate 12 on the metal plate 13 are not stable, the joining strength between the metal plate 13 and the resin plate 12 is reduced.

Figure 7F:
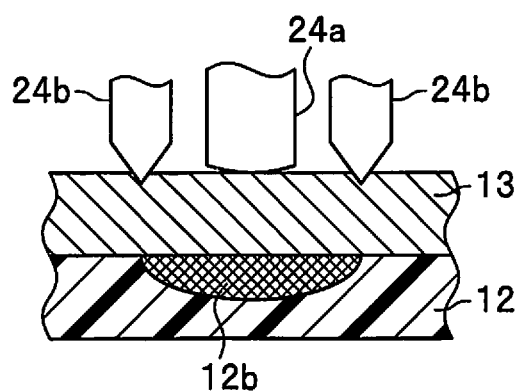
FIG. 7F shows the center electrode and the peripheral electrode having a pointed front end in an annular shape of the present embodiment being in contact with the metal plate.
Figure 7G:
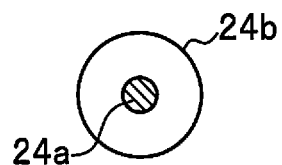
FIG. 7G shows the center electrode and the peripheral electrode having the pointed front end in an annular shape being in contact with the metal plate without any gap.
Figure 7H:
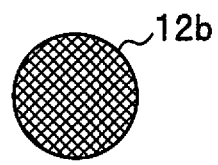
FIG. 7H shows a circular shape of the melted resin portion of the resin plate.

On the other hand, in the configuration satisfying the third condition, the peripheral electrode 24b has the pointed front end in an annular shape, as shown in FIG. 7F. In the case of the peripheral electrode 24b, since the pointed front end in an annular shape contacts the metal plate 13 without any gap, as shown in FIG. 7G, the pointed front end contacts the metal plate 13 annularly. Therefore, when a current flows from the center electrode 24a to the peripheral electrode 24b, the heated region of the metal plate 13 is in a circular shape drawn by the pointed front end in an annular shape. As a result, as shown in FIG. 7H, the melted resin portion 12b of the resin plate 12 is in a circular shape.

The metal plate 13 is made of aluminum and an oxide film is formed on its face, causing electric corrosion. However, since the front end of the peripheral electrode 24b is pointed, when the front end is contacted and pressed against the metal plate 13, it breaks the oxide film and reaches a metal face that has not been oxidized. Therefore, as shown in FIG. 7G, the front end of the peripheral electrode 24b contacts the metal plate 13 annularly and the current flows through the metal plate 13 having the same electrical resistance of the metal plate without an oxide film. Accordingly, the heated region of the metal plate 13 is in an annular shape drawn by the front end face, and the melted resin portion 12b of the resin plate 12 is in an annular shape as shown in FIG. 7H.

Figure 7I:
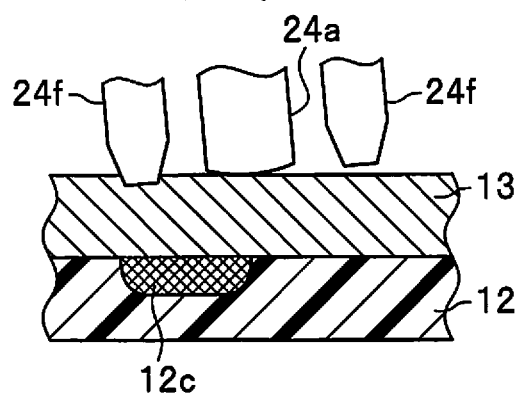
FIG. 7I shows the front end face in an annular shape of the peripheral electrode being inclined with respect to the metal plate.
Figure 7J:
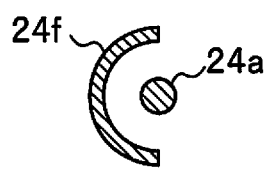
FIG. 7J shows the peripheral electrode being in contact with the metal plate, when the front end face of the peripheral electrode is inclined with respect to the metal plate.
Figure 7K:
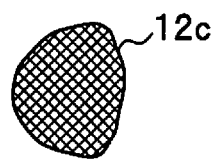
FIG. 7K shows a distorted circular shape of the melted resin portion of the resin plate.

As shown in FIG. 7I, if the front end face in an annular shape of the peripheral electrode 24f is inclined with respect to the metal plate 13, the metal plate is hardly deformed due to a low surface pressure, and the front end face does not contact the metal plate 13 annularly. For example, as shown in FIG. 7J, only a half region of the front end face in an annular shape is assumed to contact the metal plate 13. In this case, since the current flows excessively in a half region of the metal plate 13 where only a half of the front end face in an annular shape is in contact, the melted resin portion 12c of the resin plate 12 is in a distorted semicircular shape, as shown in FIG. 7K. Thus, the current excessively flows in the half region to cause the temperature to be excessively high to reach the thermal decomposition temperature of the resin plate 12 or more.

Figure 7L:
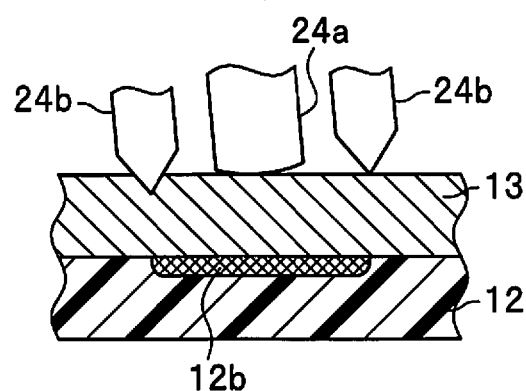
FIG. 7L shows the peripheral electrode having the pointed front end in an annular shape being slightly inclined with respect to the metal plate in terms of relative contact.
Figure 7M:
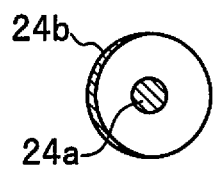
FIG. 7M shows the pointed front end in an annular shape is dented into and partly contacts the metal plate circumferentially, when the peripheral electrode having the pointed front end in an annular shape is inclined with respect to the metal plate.
Figure 7N:
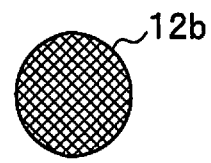
FIG. 7N shows a circular shape of the melted resin portion of the resin plate.

Further, as shown in FIG. 7L, even if the pointed front end in an annular shape of the peripheral electrode 24b is slightly inclined with respect to the metal plate 13, the pointed front end in an annular shape of the peripheral electrode 24b is dented into the metal plate 13 due to a high surface pressure, to contact annularly, as shown in FIG. 7M. Therefore, when a current flows from the center electrode 24a to the peripheral electrode 24b, the heated region of the metal plate 13 is in an annular shape drawn by the pointed front end in an annular shape. This allows, as shown in FIG. 7N, the melted resin portion 12b of the resin plate 12 to be in an annular shape.

<Operation of Manufacturing Metal-Resin Joined Body>

Next, a description will be given of operation of joining the resin plate 12 to the metal plate 13 to manufacture a metal-resin joined body, with reference to FIGS. 8A to 9B.

Figure 8A:
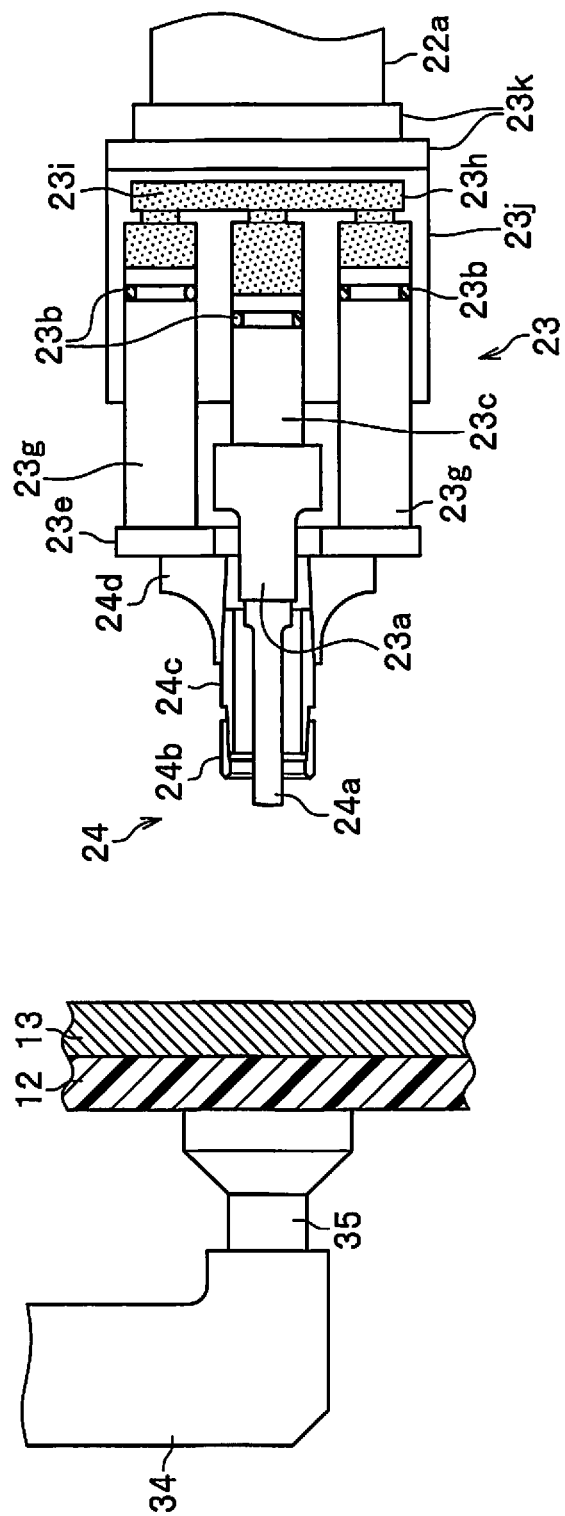
FIG. 8A is a first explanatory diagram of a metal-resin joined body being manufactured by the metal-resin joining device of the present embodiment.

As a precondition, the resin plate 12 having its one face contacting the metal plate 13 is assumed to be set to have its other face on the pressure receiving portion 35, as shown in FIG. 8A. In this setting, for example, the resin plate 12 and the metal plate 13 contacting with each other are assumed to be held and fixed by a holding and fixing mechanism (not shown). Further, the rod 22a is most contracted, and the center electrode 24a protrudes from the peripheral electrode 24b. The transformer 25 (FIG. 1) steps down the AC voltage of, for example, 600V supplied from the power supply (not shown) to the primary side to 10V so as to be outputted to the secondary side, and the rectifier 26 (FIG. 1) rectifies the AC current of, for example, 5000 A at the time of this outputting to a DC current. The positive voltage in DC voltage after the rectification is applied to the center electrode 24a via the secondary conductor 26p (FIG. 1) when the respective electrodes 24a, 24b are in contact with the metal plate 13, and the negative voltage is applied to the peripheral electrode 24b via the secondary conductor 26m (FIG. 1).

Figure 8B:
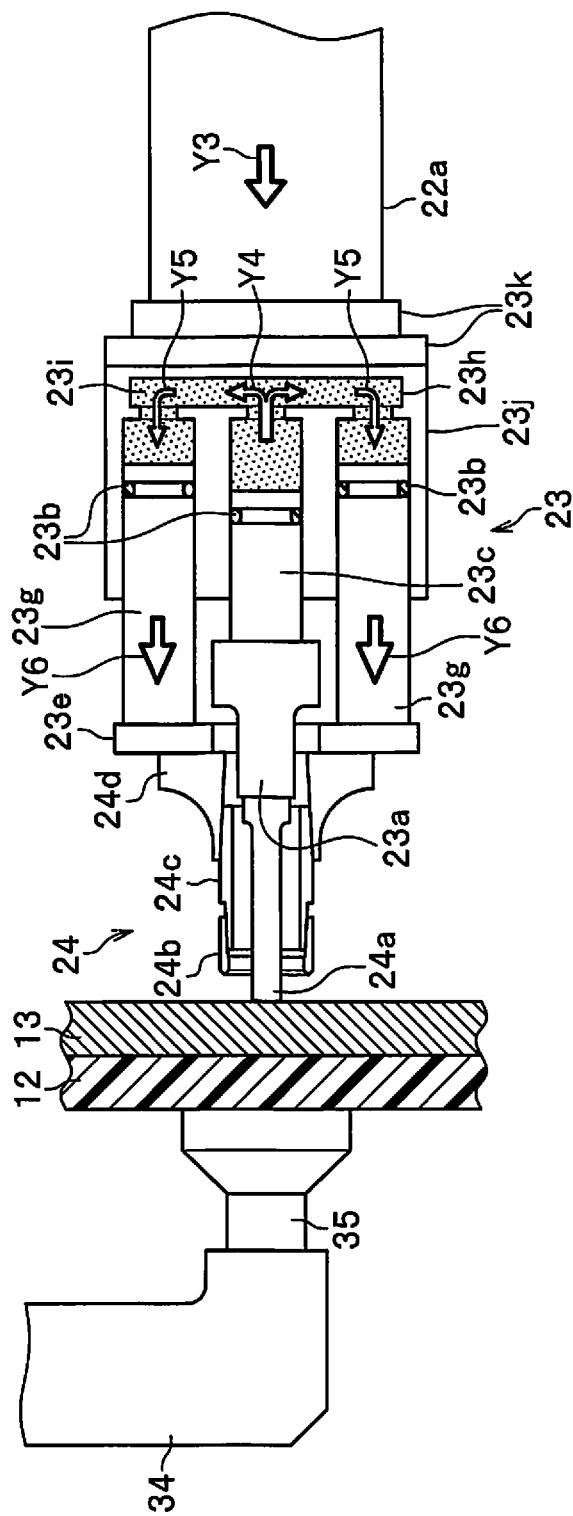
FIG. 8B is a second explanatory diagram of the metal-resin joined body being manufactured.

As indicated by an arrow Y3 in FIG. 8B, when the rod 22a is extended, the cylinder portion 23j is moved forward and the center electrode 24a is accordingly brought into contact with the metal plate 13 at a given pressure.

Figure 9A:
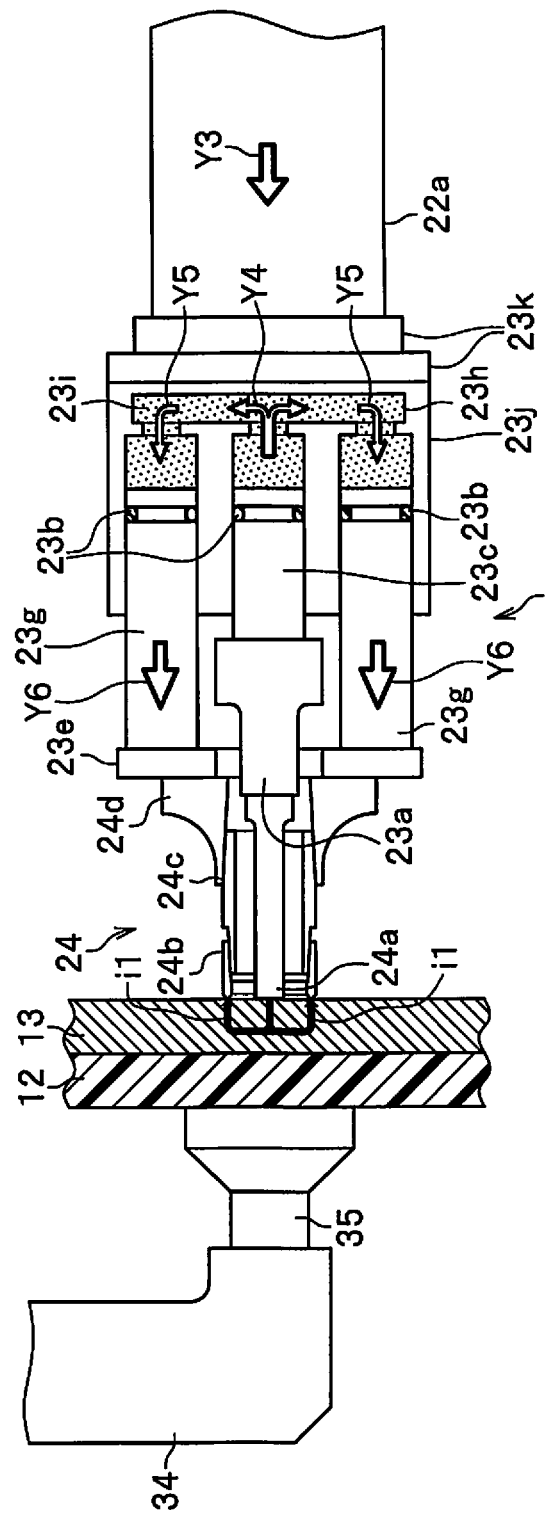
FIG. 9A is a third explanatory diagram of the metal-resin joined body being manufactured by the metal-resin joining device of the present embodiment.

When the rod 22a is further extended, the cylinder portion 23j is further moved forward, to cause the fluid 23i to be pushed rearward by the rear end of the piston 23c as indicated by an arrow Y4 in FIG. 9A. The fluid 23i further flows to press the rear ends of the upper and lower pistons 23g, 23g as indicated by arrows Y5, Y5.

With this flow and press, since the upper and lower pistons 23g, 23g move forward as indicated by arrows Y6, Y6, the piston top 23e is pressed with a given pressing force, to cause the electrode holder 24d and the shank 24c to make the peripheral electrode 24b contact the metal plate 13. At this time, since the fluid 23i in the connecting portion 23h evenly presses the three pistons 23c, 23g, 23g, the center electrode 24a and the peripheral electrode 24b are equally pressed against the metal plate 13. Note that, by changing a balance ratio between the three pistons 23c, 23g, 23g and cross-sectional areas of respective cylinders where these pistons are inserted, the pressure distribution when each electrode 24a, 24b contacts the metal plate 13 is changed to a given state.

After each electrode 24a, 24b is brought in contact with the metal plate 13, the current i1 flows from the center electrode 24a to the peripheral electrode 24b. Thus, the current i1 flows from the center electrode 24a to a circumferential end face in an annular shape of the peripheral electrode 24b. The annular area in the metal plate 13 is resistively heated with the current i1, and when the temperature reaches the resin meltable temperature by the heating, the portion (melted resin portion 12b) of the resin plate 12 is melted which is in contact with the metal of the entire region inside the annular outer edge (planar region).

When the current i1 is stopped after the melting, the melted resin portion 12b is cooled and solidified by the cooling water flowing inside the electrode 24a and the electrode holder 24d, to be joined to the metal plate 13. At this time, the metal plate 13 is pressed by the electrodes 24a, 24b until the solidification is done. Thus, the resin plate 12 is joined to the metal plate 13 to form a metal-resin joined body.

Figure 9B:
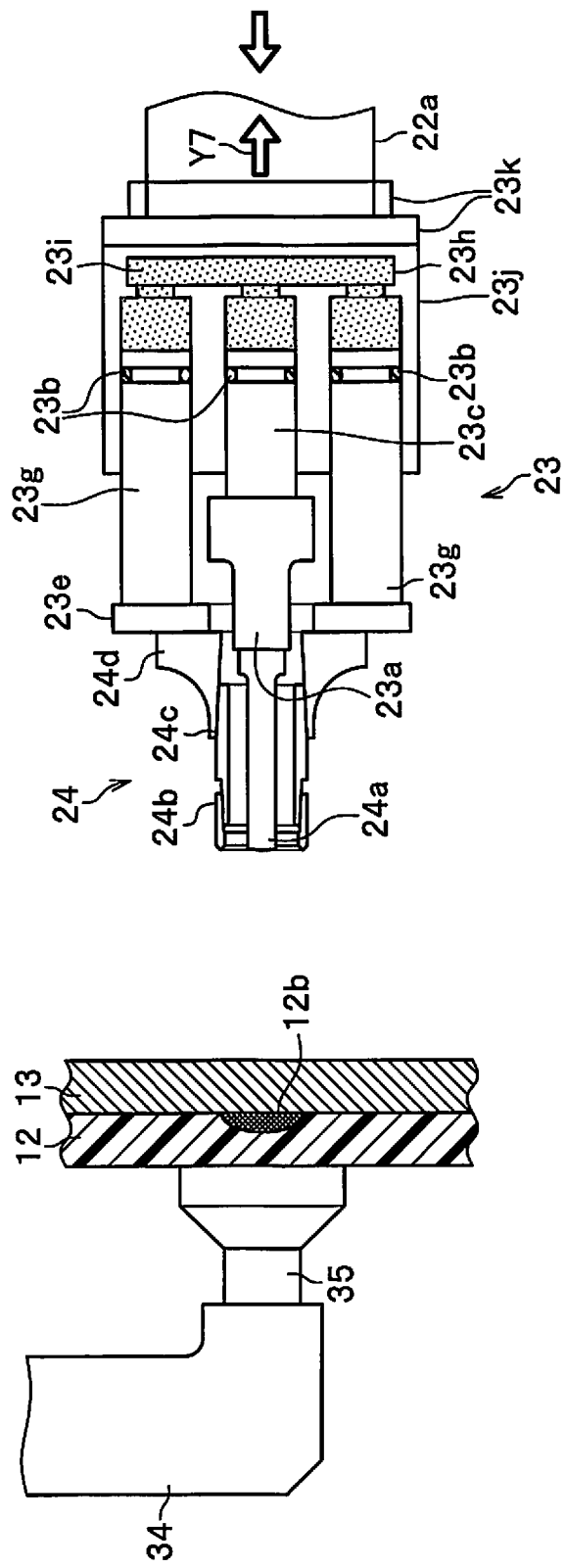
FIG. 9B is a fourth explanatory diagram the metal-resin joined body being manufactured.

Then, as indicated by an arrow Y7 in FIG. 9B, the rod 22a is contracted to have the minimum length, and the metal-resin joined body is taken out.

Advantageous Effects of Embodiment

As described above, the metal-resin joining device 20 according to the present embodiment melts the thermoplastic resin plate (resin material) 12 in contact with the metal plate (metal material) 13 with the heat by one-sided resistive heating from the exposed face of the metal plate 13, to join the resin plate 12 to the metal member 13. The features of the present embodiment are on that points that the metal-resin joining device 20 is configured as follows.

(1) The metal-resin joining device 20 has: the center electrode 24a that contacts the metal plate 13; and the peripheral electrode 24b that annularly surrounds the center electrode 24a to contact the metal plate 13 and to which a current flows from the center electrode 24a via the metal plate 13. The peripheral electrode 24b is made of a metal material having a higher electrical resistance than the center electrode 24a.

According to the configuration, when a current flows from the center electrode 24a to the peripheral electrode 24b via the metal plate 13, the current density decreases from the center electrode 24a toward the peripheral electrode 24b. On the other hand, since the peripheral electrode 24b has a higher electrical resistance than the center electrode 24a, a large amount of Joule heat is generated in the metal plate 13 near the peripheral electrode 24b. As a result, the metal plate 13 in an annular shape surrounded by the annular peripheral electrode 24b has a substantially even temperature distribution as a whole.

Accordingly, since the metal plate 13 is heated in an annular shape and substantially evenly, when the metal plate 13 is heated to have the resin meltable temperature, the resin plate that is in contact with the metal plate melts. When the melted resin plate is cooled, it is welded and joined to the metal plate. In the present invention, the current evenly flows through the portion of the metal plate enclosed by the annular peripheral electrode 24b. Therefore, when the annular region of the peripheral electrode 24b is set to have a planar shape having a given size or shape, the heated region in the metal plate 13 is made to have the given size or shape. In other words, a resistively heated region by a current of the metal plate 13 for melting the resin plate 12 can be set to have a planar shape having a given size.

Further, since the resin plate is joined by flowing a current in the metal plate to heat the resin plate, joining means such as an adhesive, a bolt, a nut, and a rivet is unnecessary, to achieve simplification and cost reduction.

(2) The metal-resin joining device 20 has: the center electrode 24a that contacts the metal plate 13; and the peripheral electrode 24b that annularly surrounds the center electrode 24a to contact the metal plate 13 and to which a current flows from the center electrode 24a via the metal plate 13. The peripheral electrode 24b is made of a metal material having a lower thermal conductivity than the center electrode 24a.

According to the configuration, since the thermal conductivity of the outer electrode 24b is lower than that of the center electrode 24a, the heat generated in the metal plate 13 less escapes through the peripheral electrode 24b than through the center electrode 24a. The center electrode 24a has higher current density than the peripheral electrode 24b and has a higher temperature than the peripheral electrode 24b. However, since the heat escapes more through the center electrode 24a than through the peripheral electrode 24b, the temperature of the center electrode 24a is lowered accordingly. As a result, the metal plate 13 in an annular shape surrounded by the annular peripheral electrode 24b has a substantially even temperature distribution as a whole. With this behavior, the same advantageous effect as in the first aspect is obtained.

(3) The metal-resin joining device 20 for joining the thermoplastic resin plate 12 to the metal plate 13 by heating the metal plate 13 to melt the resin plate 12 in contact with the metal plate 13 has: the center electrode 24a that contacts the metal plate 13; and the peripheral electrode 24b that annularly surrounds the center electrode 24a to contact the metal plate 13 and to which a current flows from the center electrode 24a via the metal plate 13. The peripheral electrode 24b is made of the metal plate 13 having a higher electrical resistance and a lower thermal conductivity than the center electrode 24a.

According to the configuration, when a current flows from the center electrode 24a to the peripheral electrode 24b via the metal plate 13, since the center electrode 24a has a higher current density than the peripheral electrode 24b, the temperature of the center electrode 24a is higher than that of the peripheral electrode 24b. However, since the center electrode 24a has a higher thermal conductivity than the peripheral electrode 24b and the heat escapes more through the center electrode 24a than through the peripheral electrode 24b, the temperature of the center electrode 24a is lowered accordingly. The current density and the temperature of the peripheral electrode 24b are low, but the electrical resistance of the peripheral electrode 24b is higher than that of the center electrode 24a, to generate a large amount of Joule heat accordingly. Further, since the peripheral electrode 24b has a lower thermal conductivity than the center electrode 24a, the heat escapes less through the peripheral electrode 24b than through the center electrode 24a and the temperature of the peripheral electrode 24b is higher accordingly. In view of the fact that the temperature of the center electrode 24a is high but is actually decreased, and the fact that the temperature of the peripheral electrode 24b is low but is actually increased, the metal plate 13 in a circular shape surrounded by the annular peripheral electrode 24b has a substantially even temperature distribution as a whole.

(4) The center electrode 24a and the peripheral electrode 24b are made of the same metal material, and the front end in an annular shape of the peripheral electrode 24b is formed to be pointed in cross-section.

(5) The center electrode 24a and the peripheral electrode 24b are formed under any one of the features (1), (2) and (3) described above, and the front end in an annular shape of the peripheral electrode 24b is formed to be pointed in cross-section.

According to the configurations (4) and (5) described above, since the front end in an annular shape of the peripheral electrode 24b is pointed, the front end annularly contacts the metal plate 13. Therefore, the contact area with the metal plate 13 is made smaller, to allow the current density around the front end to be high, so as to increase the heating temperature. Accordingly, the skewed temperature distribution trend in which the current density of the center electrode 24a is higher than that of the peripheral electrode 24b to increase the temperature and the current density of the peripheral electrode 24b is lower to decrease the temperature is changed to the substantially even temperature distribution trend.

Since the pointed front end in an annular shape of the peripheral electrode 24b is easily brought in contact with the metal plate without any gap, the heated region of the metal plate is allowed to have an annular shape drawn by the pointed front end in an annular shape, when a current flows from the center electrode 24a to the peripheral electrode 24b.

First Modification of Embodiment

Figure 10A:
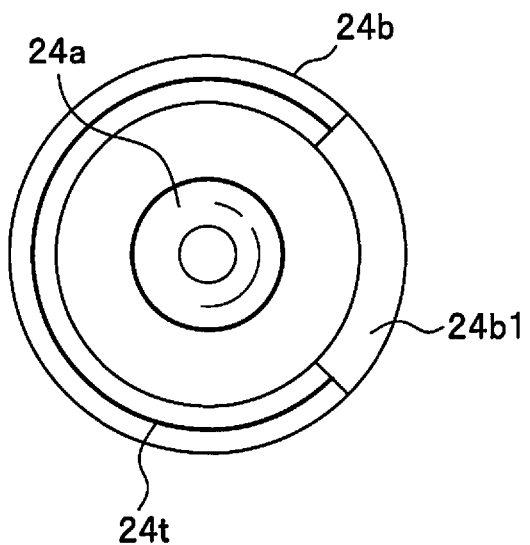
FIG. 10A is a plan view of the peripheral electrode having one slit of the metal-resin joining device according to a first modification of the present embodiment.

As a first modification, a circumferential end face having the pointed front end of the peripheral electrode 24b may have at least one slit that is formed by cutting off a part of the circumferential end face. For example, as shown in FIG. 10A, one slit 24b1 may be formed. Note that a curve 24t indicates the pointed front end of the peripheral electrode 24b. The slit 24b1 has a circumferential size of about a quarter of a circle in the circumferential end face having the pointed front end of the peripheral electrode 24b. Forming one slit 24b1 as described above requires that a portion other than the slit 24b1 of the peripheral electrode 24b annularly surrounds the center electrode 24a, and therefore a slit can have a circumferential size of less than ½ of the circle.

Figure 10B:
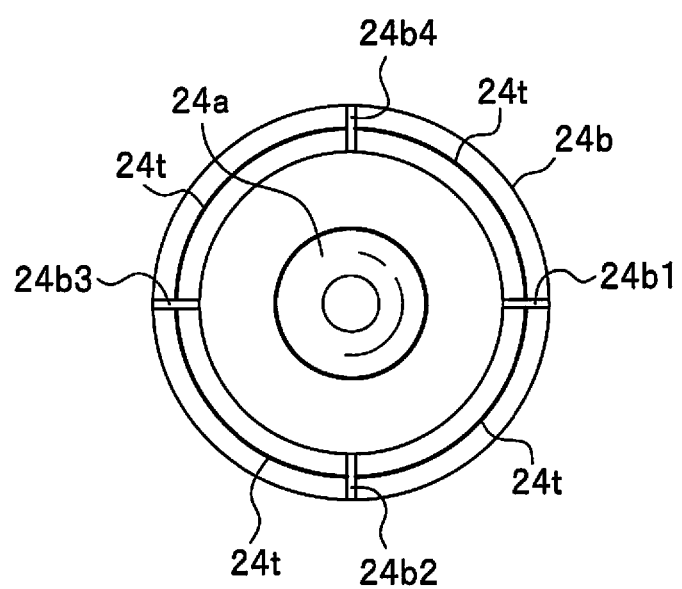
FIG. 10B is a plan view of the peripheral electrode having four slits.

Further, as shown in FIG. 10B, four slits 24b1 to 24b4 each having an extremely small circumferential size of such as 1/360 of the circle may be formed in the circumferential end face having the pointed front end of the peripheral electrode 24b.

According to the configuration, even in the case where the slit 24b1 or slits 24b1 to 24b4 is/are formed by cutting off one or more parts of the circumferential end face having the pointed front end of the peripheral electrode 24b, a current flows between the center electrode 24a and one or more end faces in an arc shape of the peripheral electrode 24b positioned at the portion other than the slit or between the slits. The metal plate 13 encircled by in the circumferential end face having the slit 24b1 or the slits 24b1 to 24b4 of the peripheral electrode 24b is resistively heated with the current. The portion of the resin plate 12 in contact with the heated metal portion can be evenly melted to join the metal plate 13.

Figure 12A:
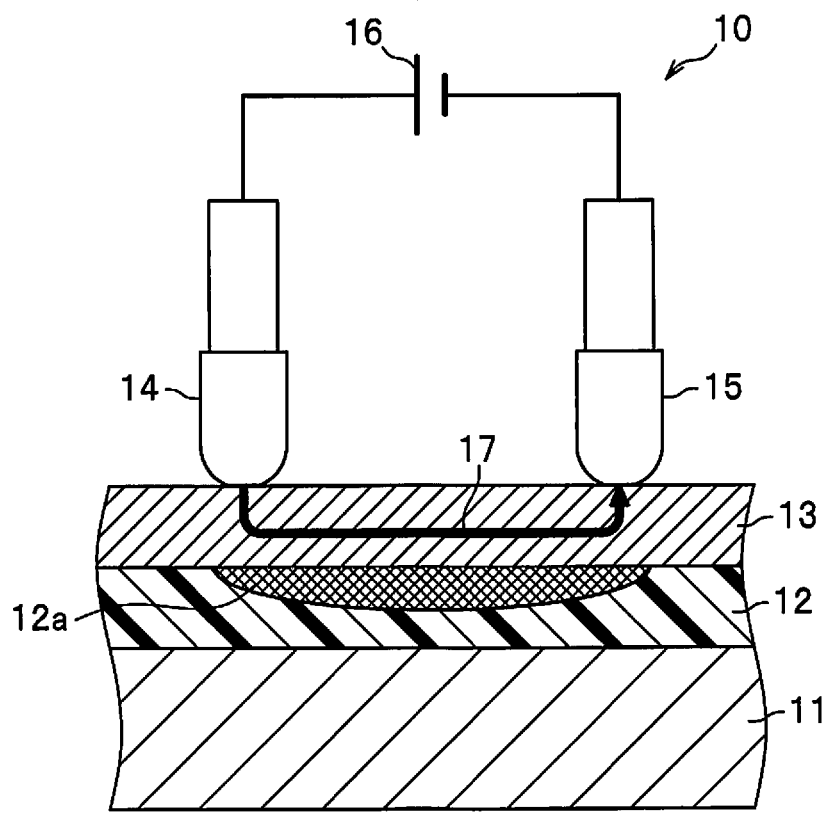
FIG. 12A is a partial side view of a joining device in a prior art shown with a metal plate and a resin plate in cross section.
Figure 12B:
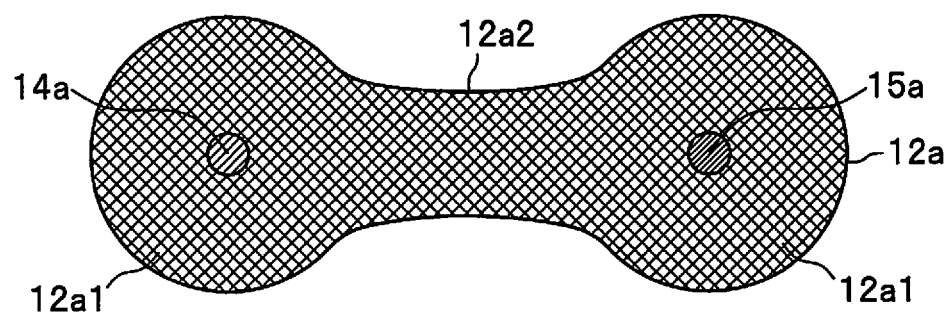
FIG. 12B is a plan view of a melted portion of the resin plate in the prior art.

Note that, as shown in FIG. 12A, in the conventional technique of pressing the positive electrode 14 and the negative electrode 15 against the upper face of the metal plate 13 to flow a current, if a current is large, the metal plate 13 facing the electrodes 14, 15 is melted to have holes. However, in the present embodiment, since a current diffusely flows to from the center electrode 24*a* to the peripheral electrode 24*b*, the metal plate 13 is less melted than the case shown in FIG. 12A.

Second Modification of Embodiment

FIGS. 11A to 11D show a configuration of the electrode portion 24A according to a fourth modification of the present embodiment.

Figure 11A:
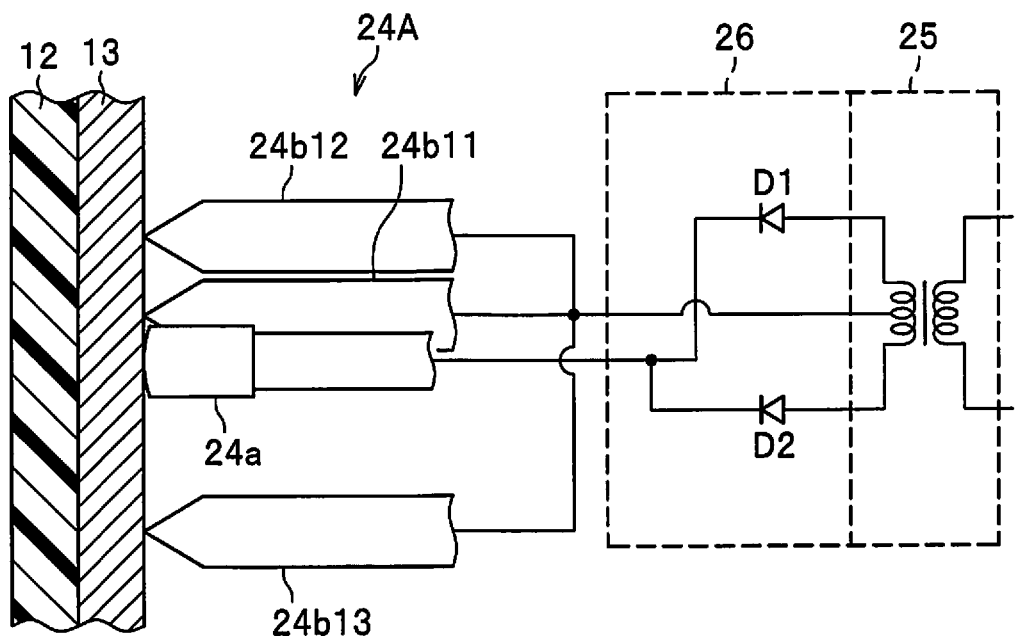
FIG. 11A is a side view of the center electrode and three electrodes surrounding the center electrode being in contact with the metal plate, in the electrode unit according to a second modification of the present embodiment.
Figure 11B:
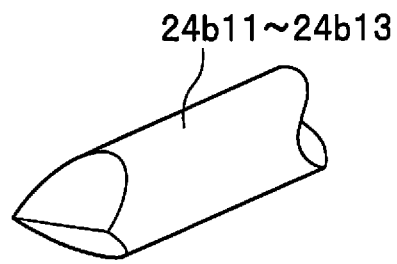
FIG. 11B is a perspective view of a front end of the the three electrodes in FIG. 11A for showing its shape.
Figure 11C:
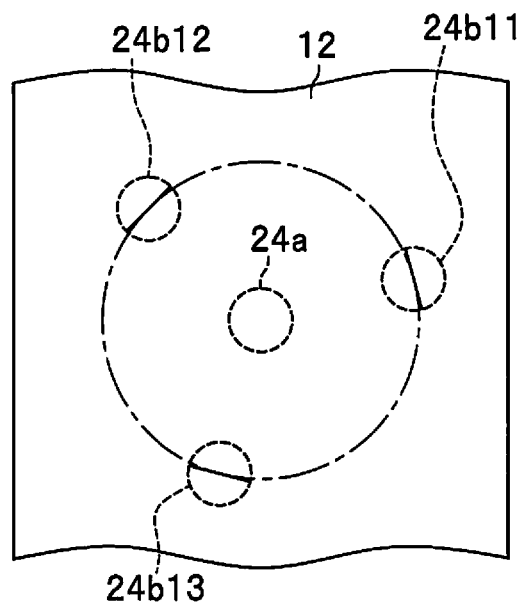
FIG. 11C is a diagram of respective electrodes being arranged as transparently viewed from a resin plate side in FIG. 11A.

The electrode portion 24A shown in FIG. 11A has the center electrode 24*a* and three separate electrodes 24*b*1, 24*b*2, and 24*b*3 separately arranged to annularly surround the center electrode 24*a* (see FIG. 11C).

As shown in FIG. 11B, the three electrodes 24*b*11 to 24*b*13 are each in a columnar shape having a sharp front end that is linearly formed to have a given length, and are integrally fixed by a holder (not shown) so that respective front ends are flush with each other.

A voltage having a polarity different from that of the center electrode 24*a* is applied from the rectifier 26 to respective electrodes 24*b*11 to 24*b*13. An AC current outputted from the transformer 25 is converted into a DC current through a center tapped full-wave rectifier circuit having diodes D1 and D2 of the rectifier 26. The electrodes 24*b*11 to 24*b*13 are applied with the voltage (for example, negative voltage) having a polarity different from the voltage (positive voltage) that is applied to the center electrode 24*a* after the conversion.

After the center electrode 24*a* and the electrodes 24*b*11 to 24*b*13 are brought in contact with the metal plate 13, the DC current that is converted in full-wave rectification by the rectifier 26 is supplied to the electrodes 24*a* and 24*b*11 to 24*b*13. Accordingly, the current flows between the electrode 24*a* and the electrodes 24*b*11 to 24*b*13 via the metal plate 13. With the configuration of the electrode portion 24A, the metal plate 13 is resistively heated with the current substantially planarly to melt the resin plate 12, so as to join the resin plate 12 to the metal plate 13.

Figure 11D:
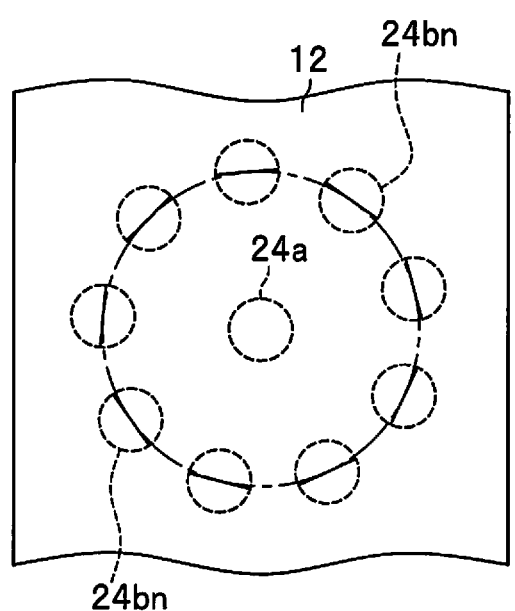
FIG. 11D is a diagram of respective electrodes being arranged as transparently viewed from the resin plate side, when the center electrode and n pieces of electrodes surrounding the center electrode being in contact with the metal plate.

The three separate electrodes 24*b*11 to 24*b*13 may be four or more separate electrodes instead, as long as the electrodes are arranged to annularly surround the center electrode 24*a*. For example, as shown in FIG. 11D, n pieces of separate electrodes 24*bn* may be arranged to surround the center electrode 24*a* annularly. As shown in FIGS. 11C and 11D, if a plurality of electrodes 24*b*11 to 24*b*13 or 24*bn* is arranged, a current flows from the center electrode 24*a* to the radially-disposed electrodes 24*b*11 to 24*b*13 or 24 *bn* substantially planarly, and then, the metal plate 13 can be heated substantially planarly by resistive heating with the current.

Besides, modifications can be made as appropriate within a scope not departing from the spirit of the present invention. Though the DC current is supplied to the electrode unit 24 from the power supply including the transformer 25 and the rectifier 26, an AC current may be supplied from another power supply.

Further, the metal-resin joining device 20 may have the center electrode 24*a* to be in contact with the metal plate 13 and the peripheral electrode 24*b* to be in contact with the metal plate 13 so as to annularly surround the center electrode 24*a* and to which a current flows from the center electrode 24*a* via the metal plate 13, wherein the peripheral electrode 24*b* is made of a metal material having a higher electrical resistance than the center electrode 24*a*.

In addition, the metal-resin joining device may have the center electrode 24*a* to be in contact with the metal plate 13 and the peripheral electrode 24*b* to be in contact with the metal plate 13 so as to annularly surround the center electrode 24*a* and to which a current flows from the center electrode 24*a* via the metal plate 13, wherein the peripheral electrode 24*b* is made of a metal material having a lower thermal conductivity than the center electrode 24*a*.

With these configurations, the metal plate 13 in a circular shape surrounded by the annular peripheral electrode 24*b* also has a substantially even temperature distribution as a whole.

DESCRIPTION OF REFERENCE NUMERALS

12 resin plate
12*b*, 12*c* melted resin portion
13 metal plate
20 metal-resin joining device
21 drive servomotor
22 drive unit
22*a* rod
22*b* ball screw
23 electrode pressing unit
23*a*, 24*d* electrode holder
23*b* packing
23*c*, 23*g* piston
23*h* connecting portion
23*i* fluid
23*j* cylinder portion
23*k* coupling
24 electrode unit
24*a* center electrode
24*b*, 24*e*, 24*f* peripheral electrode
24*c* shank
24*f*1 electric corrosion
25 transformer
26 rectifier
26*m*, 26*p* secondary conductor
31 mounting unit
31*a* plate portion
31*b* column portion
31*c* disk portion
32 arm
32*a* base
33 arm holder
34 round arm
35 pressure receiving unit
36 fixing plate
i1 current

The invention claimed is:

1. A metal-resin joining device for joining a thermoplastic resin material to a metal material by melting the resin material in contact with the metal material through heating an exposed face of the metal material by one-sided resistive heating, the device comprising:
    a center electrode that is brought in contact with the metal material; and
    a peripheral electrode that is brought in contact with the metal material so as to annularly surround the center electrode and to which a current flows from the center electrode via the metal material,
    wherein the peripheral electrode is made of a metal material having a higher electrical resistance than the center electrode.

2. The metal-resin joining device according to claim 1, wherein a front end of the peripheral electrode that is brought in contact with the metal material is in a pointed shape or a saw-tooth shape in cross-section.

3. The metal-resin joining device according to claim 2,
wherein a circumferential end of the peripheral electrode that is in contact with the metal material has at least one slit that is formed by cutting off a part of the circumferential end.

4. The metal-resin joining device according to claim 1,
wherein a circumferential end of the peripheral electrode that is in contact with the metal material has at least one slit that is formed by cutting off a part of the circumferential end.

5. The metal-resin joining device according to claim 1,
wherein at least three peripheral electrodes are arranged to annularly surround the center electrode, and each peripheral electrode has a linear sharp front end.

6. A metal-resin joining device for joining a thermoplastic resin material to a metal material by melting the resin material in contact with the metal material through heating the metal material, the device comprising:
a center electrode that is brought in contact with the metal material; and
a peripheral electrode that is brought in contact with the metal material so as to annularly surround the center electrode and to which a current flows from the center electrode via the metal material,
wherein the peripheral electrode is made of a metal material having a lower thermal conductivity than the center electrode.

7. The metal-resin joining device according to claim 6,
wherein a front end of the peripheral electrode that is brought in contact with the metal material is in a pointed shape or a saw-tooth shape in cross-section.

8. The metal-resin joining device according to claim 6,
wherein a circumferential end of the peripheral electrode that is in contact with the metal material has at least one slit that is formed by cutting off a part of the circumferential end.

9. The metal-resin joining device according to claim 6,
wherein at least three peripheral electrodes are arranged to annularly surround the center electrode, and each peripheral electrode has a linear sharp front end.

10. A metal-resin joining device for joining a thermoplastic resin material to a metal material by melting the resin material in contact with the metal material through heating the metal material, the device comprising:
a center electrode that is brought in contact with the metal material; and
a peripheral electrode that is brought in contact with the metal material so as to annularly surround the center electrode and to which a current flows from the center electrode via the metal material,
wherein the peripheral electrode is made of a metal material having a higher electrical resistance and a lower thermal conductivity than the center electrode.

11. The metal-resin joining device according to claim 10,
wherein a front end of the peripheral electrode that is brought in contact with the metal material is in a pointed shape or a saw-tooth shape in cross-section.

12. The metal-resin joining device according to claim 10,
wherein a circumferential end of the peripheral electrode that is in contact with the metal material has at least one slit that is formed by cutting off a part of the circumferential end.

13. The metal-resin joining device according to claim 10,
wherein at least three peripheral electrodes are arranged to annularly surround the center electrode, and each peripheral electrode has a linear sharp front end.

* * * * *